United States Patent [19]

Kondo et al.

[11] 4,430,542

[45] Feb. 7, 1984

[54] ELECTROMAGNETIC COOKING APPARATUS

[75] Inventors: Shigeki Kondo, Tachikawa; Yoshio Yamazaki, Saitama; Tomofumi Iketani, Fuchu; Seiji Tanaka, Yamatokoriyama; Keiichiro Doi, Izumi, all of Japan

[73] Assignees: Riccar Co., Ltd., Tokyo; Sharp Kabushiki Kaisha, Osaka, both of Japan

[21] Appl. No.: 301,129

[22] Filed: Sep. 11, 1981

[30] Foreign Application Priority Data

Sep. 20, 1980 [JP] Japan ............................... 55-131121

[51] Int. Cl.³ ....................... H05B 6/06; H02M 7/537

[52] U.S. Cl. .......................... 219/10.77; 219/10.49 R; 363/80; 363/97; 323/235; 307/252 UA

[58] Field of Search ..................... 219/10.49 R, 10.77; 363/80, 97, 131, 56; 323/319, 235; 307/253, 252 UA

[56] References Cited

U.S. PATENT DOCUMENTS

| | | | |
|---|---|---|---|
| 4,115,676 | 9/1978 | Higuchi et al. | 219/10.49 R |
| 4,145,592 | 3/1979 | Mizukawa et al. | 219/10.49 R |
| 4,209,683 | 6/1980 | Kiuchi et al. | 219/10.77 |
| 4,277,667 | 7/1981 | Kiuchi | 219/10.49 R |
| 4,338,503 | 7/1982 | Ito et al. | 219/10.77 |
| 4,352,000 | 9/1982 | Fujishima et al. | 219/10.77 |
| 4,358,654 | 11/1982 | Estes | 219/10.77 |

*Primary Examiner*—B. A. Reynolds
*Assistant Examiner*—Philip H. Leung
*Attorney, Agent, or Firm*—Birch, Stewart, Kolasch & Birch

[57] ABSTRACT

The disclosure is directed to an improved electromagnetic cooking apparatus which is so arranged that the maximum voltage to be impressed to a switching transistor employed in it may be lowered to a desired level for a stable operation at high reliability.

3 Claims, 15 Drawing Figures

Figure 5:
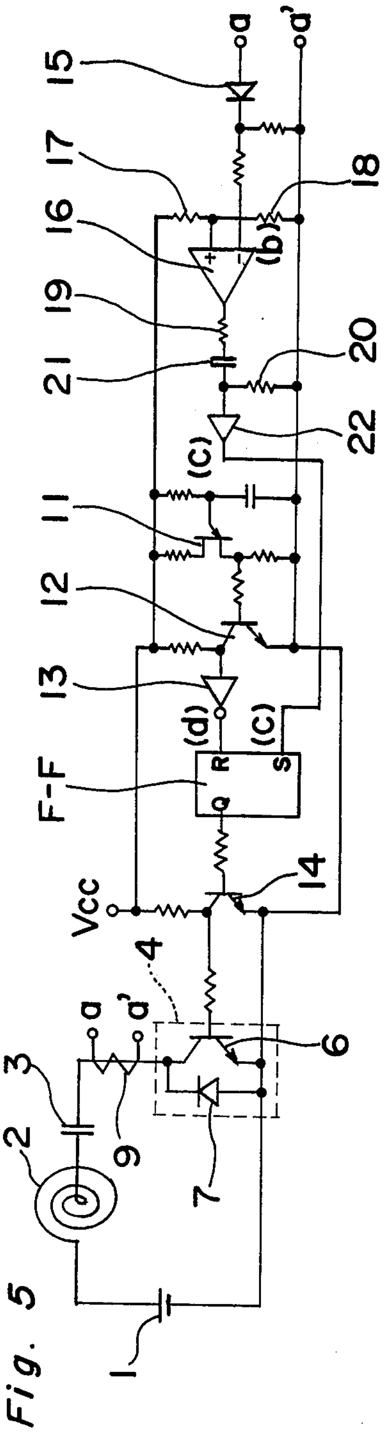

Fig. 1 PRIOR ART
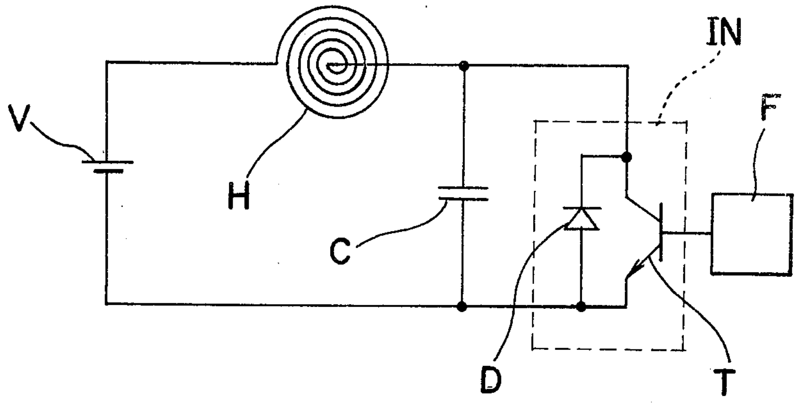
PRIOR ART
Fig. 2(a)
Fig. 2(b)
Fig. 2(c)
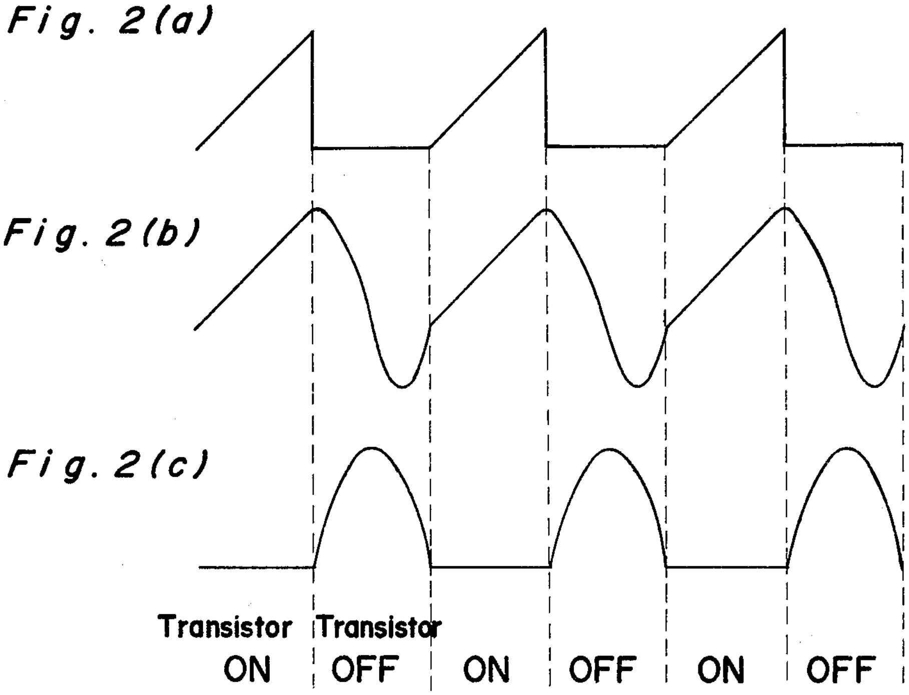

*Fig. 3*
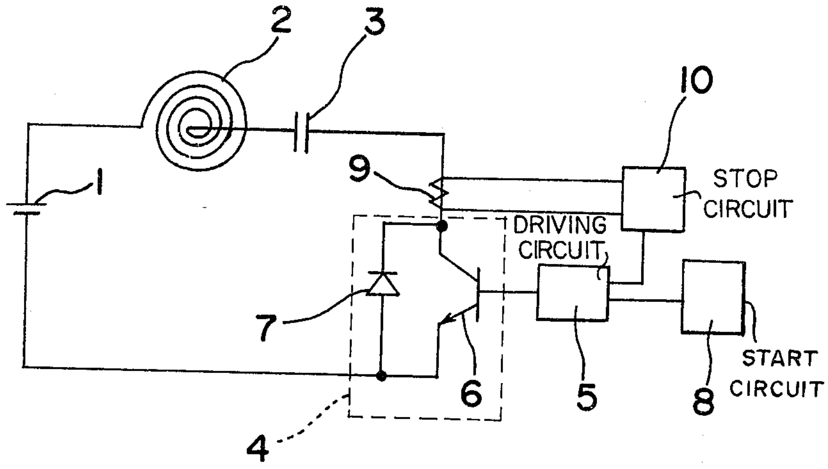
*Fig. 4(a)*
*Fig. 4(b)*
*Fig. 4(c)*
*Fig. 4(d)*
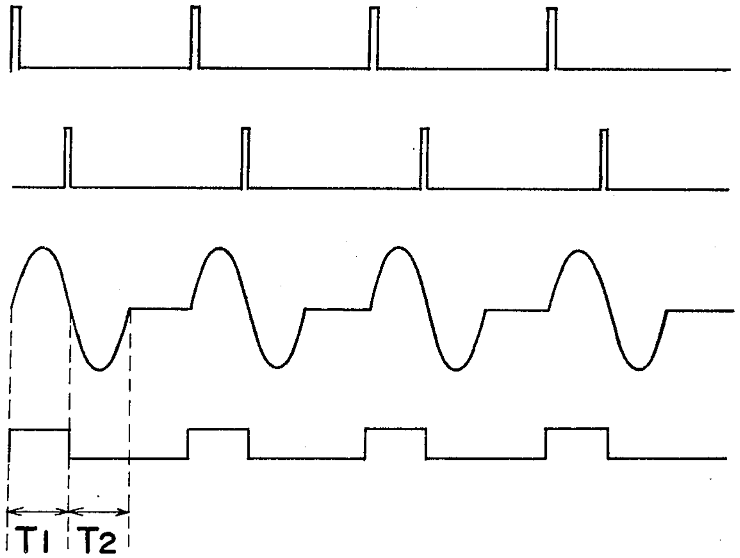

ELECTROMAGNETIC COOKING APPARATUS

The present invention generally relates to a heating or cooking apparatus and more particularly, to an improved electromagnetic cooking apparatus which is arranged such that the maximum voltage of a switching transistor of a high frequency inverter employed therein may be advantageously lowered.

The electromagnetic cooking apparatus has come to be widely employed in recent years, since it is not required to be particularly provided with a heating or cooking chamber due to the fact there is no need to prevent the leakage of electromagnetic waves as in a high frequency heating apparatus, while at the same time it may be used as an ordinary kitchen-table when not in use as a cooking apparatus.

In FIG. 1 showing an electrical circuit diagram of a conventional electromagnetic cooking apparatus, there is provided a heating coil H and a capacitor C connected in series between both terminals of a DC power supply V, an inverter IN connected in parallel with the capacitor C and further coupled to a driving circuit F for controlling the ON-OFF of the inverter IN, as shown. The inverter IN further includes a switching transistor T applied, at its base, with an output signal from the driving circuit F, and a diode D as a damper connected in the reverse direction between the collector-emitter of the transistor T.

Accordingly, when the switching transistor T is rendered conductive by the output signal of the driving circuit F, a series circuit is formed by the heating coil H and the switching transistor T, and thus, a current which increases with time under the influence of inductance of the heating coil H, flows through the collector of the switching transistor T.

Meanwhile, if the switching transistor T is cut off by the output signal of the driving circuit F, the collector current becomes immediately zero (see FIG. 2(*a*)).

When the switching transistor T is kept in conduction, a current which is equal to the collector current, flows through the heating coil H. However, when the switching transistor T is cut-off, the current of the heating coil H does not become immediately zero, and thus, electric charge is stored in the capacitor C.

Therefore, as the voltage across the terminals of the capacitor C becomes gradually higher and reaches a predetermined value, the stored electric charge is discharged through the heating coil H (see FIGS. 2(*b*), and 2(*c*)). In other words, a resonance current flows through a resonance circuit which is formed by the heating coil H and the capacitor C.

In the above case, the conventional electromagnetic cooking apparatus has a disadvantage in that a switching transistor T capable of withstanding voltage exceeding 800 V must be used for a safe and stable operation, since the voltage across the terminals of the capacitor C may become considerably high, e.g. as high as 800 V or more according to the conditions.

Accordingly, an essential object of the present invention is to provide an improved electromagnetic cooking apparatus which is so arranged that the maximum voltage to be impressed to a switching transistor employed therein may be lowered to a desired level for a stable operation at high reliability.

Another important object of the present invention is to provide an improved electromagnetic cooking apparatus of the above described type which is simple in circuit construction and accurate in functioning at high reliability, and can be produced at low cost.

In accomplishing these and other objects, according to one preferred embodiment of the present invention, there is provided an electromagnetic cooking apparatus which includes a resonance circuit composed of a heating coil and a capacitor, an inverter circuit including a switching transistor and a diode connected between the collector and emitter of the switching transistor in the reverse direction, with the resonance circuit and inverter circuit being connected in series across terminals of a DC power source, a start-signal generating circuit for periodically developing start pulse signal, a stop-signal generating circuit which receives value of current flowing through the heating coil as an input signal so as to develop a stop pulse signal when the value of the current becomes zero, and a driving circuit coupled to the inverter circuit and also to the start-signal generating circuit and the stop-signal generating circuit so as to receive the start pulse signal and stop pulse signal as inputs and to develop a signal for rendering the switching transistor conductive after developing the start pulse signal until developing of the stop pulse signal.

By the arrangement according to the present invention as described above, an improved electromagnetic cooking apparatus has been advantageously presented, with substantial elimination of disadvantages inherent in the conventional electromagnetic cooking apparatuses of this kind.

Figures 6A, 6B, 6C, 6D, 6E:
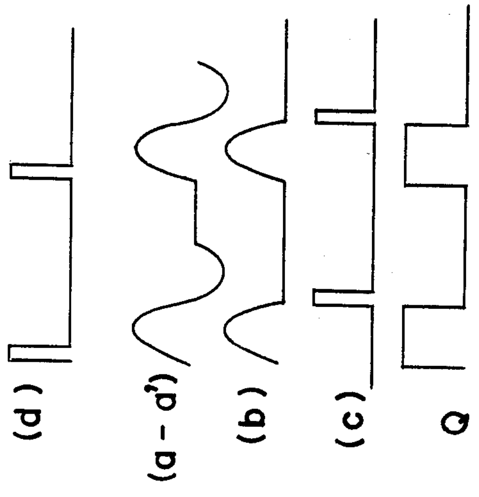

These and other objects and features of the present invention will become apparent from the following description taken in conjunction with the preferred embodiment thereof with reference to the accompanying drawings, in which:

FIG. 1 is an electrical diagram showing a circuit arrangement of a conventional electromagnetic cooking apparatus (already referred to), FIGS. 2(*a*) to 2(*c*) are waveform diagrams showing states of currents and voltages at various parts of the circuit arrangement of FIG. 1(already referred to), FIG. 3 is an electrical diagram showing a circuit arrangement of an improved electromagnetic cooking apparatus according to one preferred embodiment of the present invention, FIGS. 4(*a*) to 4(*d*) are diagrams showing states of signals, currents and voltages at various parts of the circuit arrangement of FIG. 3, FIG. 5 is a diagram similar to FIG. 3, which particularly shows the detailed construction of the circuit arrangement of FIG. 3, and FIGS. 6(*a*) to 6(*e*) are time charts explanatory of functions of the circuit construction of FIG. 5.

Before the description of the present invention proceeds, it is to be noted that like parts are designated by like reference numerals throughout several views of the accompanying drawings.

Referring now to the drawings, there is shown in FIG. 3 a circuit arrangement of an electromagnetic cooking apparatus according to one preferred embodiment of the present invention which generally includes a heating coil 2, a capacitor 3, and an inverter 4 which are connected in series to each other in the above order, and coupled across both terminals of a DC power supply 1, a driving circuit 5 connected to the inverter 4 for controlling the ON-OFF of said inverter 4, a start-signal generating circuit 8 connected to the driving circuit 5, and a stop-signal generating circuit 10 which receives an output of a current transformer 9 and is also coupled to said driving circuit 5. The inverter 4 further comprises a switching transistor 6 applied, at its base, with an output signal from the driving circuit 5, and a diode 7 as a damper connected in the reverse direction between the collector and emitter of the transistor 6.

Accordingly, when a pulse-shaped start signal (see FIG. 4(*a*)) is developed from the start-signal generating circuit 8, the output of the driving circuit 5 becomes high in level (see FIG. 4(*d*)) to render the switching transistor 6 conductive so that a sine wave current flows (see FIG. 4(*c*)) through a resonance circuit composed of the heating coil 2 and the capacitor 3.

A signal, which corresponds to the sine wave current value, is applied to the stop-signal generating circuit 10 by the current transformer 9, and when the sine wave current value has become zero, the pulse-shaped stop signal (see FIG. 4(*b*)) is produced therefrom to render the output of the driving circuit 5 low in level. Accordingly, the switching transistor 6 is brought into a cut-off state.

In other words, the switching transistor 6 becomes conductive only while the current flowing through the heating coil 2 is at its positive half-period. As soon as the switching transistor 6 is cut off, the diode 7 becomes conductive so that excessive voltage is not at all applied to the switching transistor 6.

Moreover, even when the diode 7 has been cut off after completion of current flow for the negative half-period through the heating coil 2, the current flowing through the heating coil 2 is zero, and different from the conventional arrangements. Since abrupt variation in current value does not exist, there is no possibility of applying a high voltage to the switching transistor 6, at all, even in this case.

More specifically, referring further to FIG. 5 showing the detailed construction of the circuit arrangement of FIG. 3, the start-signal generating circuit 8 includes a uni-junction transistor 11, a transistor 12 and an inverter 13 which are connected to each other through suitable resistors, and the start signal indicated by (*d*) in FIG. 5 and FIG. 6(*a*) is applied through the inverter 13 to the R input of a flip-flop F-F. Upon receipt of the signal at the R input, the Q output of the flip-flop F-F is rendered to be "high" so as to turn ON the switching transistor 6 through an amplifying transistor 14 whose base is connected to the Q output via a suitable resistor.

When the switching transistor 6 is turned ON as described above, the current as indicated by (a–a′) in FIG. 6(*b*) is caused to flow by the resonance circuit formed by the heating coil 2 and capacitor 3. Upon detection of the current by the current transformer 9 and half-wave rectification thereof by the diode 15, the current takes the waveform as indicated by (*b*) in FIG. 6(*c*), and resistors 17 and 18 coupled to a comparator 16 are so determined, in the values thereof, such that the output of the comparator 16 is rendered to be "high" when the current becomes zero. When the output of the comparator 16 becomes "high", the output of a buffer 22 connected to the output of the comparator 16 through a resistor 19, a capacitor 21 and a resistor 20, takes the form as indicated by (*c*) in FIG. 6(*d*) owing to the functions of such resistors 19 and 20 and capacitor 21. Since the output of the buffer 22 is coupled to the S input of the flip-flop F-F, the output Q of the flip-flop is rendered to be "low" (FIG. 6(*e*)), and thus the transistor 6 is turned OFF.

It should be noted here that, on the assumption that the transistor 6 in the foregoing embodiment be replaced, for example, by an element such as a silicon controlled rectifier, GTO (gate turn-off thyristor), or the like, if the increase of voltage to be impressed across the anode and cathode thereof during the OFF period becomes too rapid, the element is undesirably turned ON again and tends to be damaged, thus requiring a protecting circuit or the like. More specifically, when the silicon controlled rectifier, GTO (gate turn-off thyristor), etc. are changed over from the ON state to OFF state, the rapidly rising voltage is applied across the anode and cathode thereof, and thus, the silicon controlled rectifier, GTO (gate turn-off thyristor), etc., are wrongly turned ON. In the case of a transistor as in the present invention, the transistor is not turned ON unless the "high" signal is applied to its base, and, therefore, may be employed with less problems than in the silicon controlled rectifier, GTO (gate turn-off thyristor), and the like.

As is clear from the foregoing description, the present invention provides a special effect in that impression of an excessively high voltage to the switching transistor is positively prevented, by arranging in such a manner that the switching transistor is cut off when the value of current flowing through the heating coil becomes zero.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An electromagnetic cooking apparatus which comprises a resonance circuit composed of a heating coil and a capacitor, an inverter circuit including a switching power transistor having a base and a diode connected between a collector and an emitter of said switching transistor in the reverse direction, said resonance circuit and inverter circuit being connected in series across terminals of a DC power source, a start-signal generating circuit for periodically developing a start pulse signal, a stop-signal generating circuit which receives value of current flowing through said heating coil as an input signal so as to develop a stop pulse signal when the value of said current becomes zero, and a driving circuit coupled to said inverter circuit and also to said start-signal generating circuit and said stop-signal generating circuit so as to receive said start pulse signal and said stop pulse signal as inputs and to develop a signal for rendering said switching transistor conductive after developing said start pulse signal until developing of said stop pulse signal, whereby the timing of switching of said transistor is controlled through detection of current flowing through said heating coil and said stop pulse signal is produced when the current value flowing through said heating coil becomes zero.

2. An electromagnetic cooking apparatus according to claim 1, wherein said driving circuit is connected to said base of said switching transistor of said inverter circuit.

3. An electromagnetic cooking apparatus according to claim 1, wherein said stop-signal generating circuit is coupled with said resonance circuit through a current transformer.

* * * * *